United States Patent
Monforte

(10) Patent No.: US 8,424,331 B2
(45) Date of Patent: Apr. 23, 2013

(54) AIR CONDITIONING SYSTEM FOR A MOTOR-VEHICLE, WITH AN AIR COOLING SECONDARY CIRCUIT CONNECTABLE TO THE HEATING CIRCUIT

(75) Inventor: Roberto Monforte, Turin (IT)

(73) Assignee: Fiat Group Automobiles S.p.A., Turin (IT)

( * ) Notice: Subject to any disclaimer, the term of this patent is extended or adjusted under 35 U.S.C. 154(b) by 986 days.

(21) Appl. No.: 12/432,223

(22) Filed: Apr. 29, 2009

(65) Prior Publication Data

US 2009/0293525 A1    Dec. 3, 2009

(30) Foreign Application Priority Data

May 30, 2008    (EP) .................................... 08425393

(51) Int. Cl.
*B60H 1/32*    (2006.01)
*F25B 7/00*    (2006.01)

(52) U.S. Cl.
USPC ................................. 62/244; 62/175; 62/239

(58) Field of Classification Search .................... 62/244, 62/185, 201, 175, 323.1
See application file for complete search history.

(56) References Cited

U.S. PATENT DOCUMENTS

| | | | | |
|---|---|---|---|---|
| 1,653,604 | A * | 12/1927 | Schroder | 165/44 |
| 2,279,657 | A * | 4/1942 | Crawford | 62/157 |
| 5,301,515 | A * | 4/1994 | Iritani et al. | 62/126 |
| 6,640,889 | B1 * | 11/2003 | Harte et al. | 165/202 |
| 7,451,808 | B2 * | 11/2008 | Busse et al. | 165/202 |
| 8,209,993 | B2 * | 7/2012 | Carlson et al. | 62/259.2 |
| 8,220,284 | B2 * | 7/2012 | Tsubone | 62/324.4 |
| 2003/0200763 | A1 * | 10/2003 | Takeuchi | 62/324.6 |
| 2003/0217833 | A1 * | 11/2003 | Alber et al. | 165/42 |
| 2004/0000161 | A1 * | 1/2004 | Khelifa et al. | 62/324.1 |
| 2004/0035130 | A1 * | 2/2004 | Amaral et al. | 62/323.1 |
| 2004/0060312 | A1 * | 4/2004 | Horn et al. | 62/244 |
| 2004/0139757 | A1 * | 7/2004 | Kuehl et al. | 62/237 |
| 2005/0039878 | A1 * | 2/2005 | Meyer et al. | 165/42 |
| 2006/0123824 | A1 * | 6/2006 | Casar et al. | 62/244 |

FOREIGN PATENT DOCUMENTS

| | | |
|---|---|---|
| EP | 1 302 731 | 4/2003 |
| EP | 1 719 646 | 11/2006 |
| FR | 2 858 268 | 2/2005 |
| FR | 2 876 323 | 4/2006 |
| JP | 9169207 | 6/1997 |
| JP | 2003211935 | 7/2003 |

OTHER PUBLICATIONS

European Search Report for EP 08425393.9 dated Oct. 30, 2008.

* cited by examiner

*Primary Examiner* — Ljiljana Ciric
*Assistant Examiner* — Alexis Cox
(74) *Attorney, Agent, or Firm* — Nixon & Vanderhye P.C.

(57) ABSTRACT

An air-conditioning system of a motor vehicle, including: a primary, gas compression cooling circuit set entirely in the engine compartment; a secondary cooling circuit that takes cold from an evaporator or chiller of the primary circuit and conveys it to a heat exchanger in the passenger compartment; the system has elements for setting in fluid communication the primary circuit, the secondary circuit and a circuit for heating the passenger compartment. The heating circuit has a heat exchanger which is used as a heater when the heating system is activated, and can be used as additional mass for cooling air of the passenger compartment to meet the peak cooling requirement.

5 Claims, 3 Drawing Sheets

Prior Art

Prior Art

AIR CONDITIONING SYSTEM FOR A MOTOR-VEHICLE, WITH AN AIR COOLING SECONDARY CIRCUIT CONNECTABLE TO THE HEATING CIRCUIT

The present invention relates to air-conditioning systems for motor vehicles, of the type specified in the preamble of claim 1.

FIG. 1 of the annexed drawings is a schematic plan view of an air-conditioning system for motor vehicles, of a conventional type. In said figure, designated as a whole by 1 is the firewall that separates the passenger compartment 2 from the engine compartment 3 of the motor vehicle, set in which is an internal-combustion engine 4. According to the traditional technique illustrated in FIG. 1, the vehicle is equipped with a circuit for cooling the air conveyed into the passenger compartment 2, which is in the form of a vapour-compression circuit, operating with coolant (for example an HFC fluorinate). The circuit comprises four main components: a compressor 5, a condenser 6, an expansion device 7, and an evaporator 8. In said traditional solution, the components of the cooling circuit are all set in the engine compartment 3, except for the evaporator 8, which is instead situated within the passenger compartment 2, usually within the dashboard, inside a containment structure made of plastic material that has the purpose of channelling the flow of air that traverses the evaporator 8 towards the outlets provided on the dashboard for distribution of the conditioned air in the passenger compartment. The expansion device 7 is usually set in an area corresponding to the firewall 1, which constitutes the interface between the passenger compartment 2 and the engine compartment 3. The operating fluid is directed from the engine compartment towards the evaporator 8 in the state of hot liquid and at high pressure. As said fluid traverses the expansion device 7, it loses pressure and cools off. As it traverses the evaporator 8, it extracts, by absorption, heat from the air, cooling it and dehumidifying it, in the form of latent heat and going into conditions of saturated or superheated vapour. The heat is hence extracted from the passenger compartment and again conveyed towards the external environment in two steps: first it passes from the air of the passenger compartment to the fluid operating in the gas-compression circuit in the low-pressure heat exchanger (i.e., the evaporator 8), and then, once brought to a higher level of pressure by the compressor, it is transferred to the external environment through a heat exchanger installed on the front of the vehicle (the condenser 6).

Once again with reference to FIG. 1, the portion of the system dedicated to heating of the passenger compartment is obtained, instead, by means of a branch 9 of the system for cooling the engine 4, operating with a mixture of water and ethylene glycol, in the liquid state. This hot mixture traverses a heat exchanger 10, or radiant mass, set within the air-conditioning module associated to the dashboard of the motor vehicle, within the passenger compartment, and downstream of the evaporator 8 with respect to the flow of air that is conveyed into the passenger compartment. The fresh air taken in from outside the passenger compartment is first cooled and dehumidified through the evaporator 8 and then, if necessary, heated through the radiant mass 1, in the case where both of the systems are activated. When the heating circuit of the air is inactive, a valve (not illustrated) prevents the flow of hot liquid through the heater 10, causing said hot liquid to flow in a by-pass duct (not illustrated). In certain systems a hatch that acts on the flow of air performs the same function, insulating the radiant mass or forcing all or part of the air flow to traverse it.

FIG. 2 of the annexed drawings shows a second type of air-conditioning system (which is also in itself known), to which the present invention makes specific reference. In the system of FIG. 2, the heat is subtracted from the air of the passenger compartment by means of an air-cooling secondary circuit. In FIG. 2, the parts in common with those of FIG. 1 are designated by the same reference numbers. As may be seen, also in the case of FIG. 2, a primary cooling circuit is provided that includes a condenser 6, an evaporator (referred to as "chiller") 11, a compressor 5, and an expansion device 7, but in this case all the components of said primary circuit, including the chiller 11, are contained in the engine compartment. The heat is subtracted from the air of the passenger compartment by means of the aforesaid secondary cooling circuit, which operates with a mixture of water and ethylene glycol of the same type as the one used in the circuit for heating the passenger compartment and that is set between the passenger compartment and the primary circuit. The secondary circuit is basically made up of two heat exchangers: a first heat exchanger constituted by the same chiller 11 mentioned above, set in the engine compartment and functioning as intermediate heat exchanger for subtracting heat from the fluid of the secondary circuit; and a second heat exchanger 12 (referred to as "air cooler"), installed, instead of the evaporator 8 within the dashboard upstream of the heater 10 with respect to the flow of air directed towards the passenger compartment, which receives the cold fluid coming from the heat exchanger 11 and subtracts the heat from the air that traverses it. As may be seen, the known solution illustrated in FIG. 2 differs from that of FIG. 1 as regards two main aspects:
1) the gas-compression circuit is entirely contained in the engine compartment; and
2) the heat is subtracted from the air of the passenger compartment not directly but by interposition of a secondary circuit operating with a mixture of water and ethylene glycol.

The mixture that functions as vector of heat in the secondary circuit is pushed into the secondary circuit by an electrically operated pump 13 independent of that of the system for cooling the engine, which is usually a pump driven by the engine shaft by means of a belt transmission.

The known solutions described above both present a drawback. When a motor vehicle is standing still for a long time in weather conditions such as to cause a considerable heating of the passenger compartment (for example, when a person prepares to get into the vehicle after it has been standing still for a long time in the sun on a summer's day and the sun is still high), the air-conditioning system is set at the maximum power and must change the air in the passenger compartment rapidly to generate therein comfortable environmental conditions. When the air has been entirely changed with other fresher air, the point of operation of the air-conditioning system can be modified from the condition of maximum power to one of maintenance of the conditions of comfort, characterized by lower flows of air and of coolant gas through the circuit in which the primary fluid operates and in particular through the evaporator. The traditional system, also referred to as "direct evaporation" (FIG. 1) is sized so as to be able to guarantee that the conditions of comfort are achieved within a period of about ten minutes. In a vehicle that habitually makes journeys of long duration, the system will hence be prevalently underused, because the components are sized rather according to the maximum power requirement, which is in this case expressed only in the first few minutes of operation. Looking at this the other way round, we may say that the air-conditioning system in this type of vehicle, designed for long journeys is oversized with respect to the power that it must generate for the majority of the time in which it is running.

The secondary-circuit system presents a further handicap: the time required for reaching the conditions of comfort is even longer on account of the thermal inertia constituted by the intermediate heat exchanger (chiller) and by the charge of water/glycol mixture that fills the secondary circuit. A solution that has proven effective for overcoming this handicap of the secondary-circuit system is the adoption of a compressor of higher cubic capacity.

The object of the present invention is to overcome the drawbacks of the known solutions and in particular to provide an air-conditioning system that will be able to satisfy effectively the need for cooling in any operating condition, without, however, being oversized with respect to the prevalent conditions of use.

A further purpose is to provide an air-conditioning system for a motor vehicle that will be able to respond efficiently to the demand for high performance in any condition of use, without this leading to any greater complication as compared to the systems of the same type that have been produced so far.

With a view to achieving said purpose, the subject of the invention is a system having the characteristics specified in claim 1.

The basic idea underlying the present invention is to use the heat exchanger that forms part of the heating system as additional cooling mass in the operating conditions in which the air-conditioning system is required to furnish the maximum cooling power. In this way, it is possible to meet up in an efficient way to the situations in which it is called upon to provide the maximum cooling power without this involving the need to oversize the system with respect to the conditions in which it prevalently has to operate.

The supply of the "hot" radiant mass with a cold mixture during the transients of cooling of the passenger compartment makes available an additional cold power, complementary to the basic power made available by the cooling circuit. Said additional power, by enabling the peak demand to be met in the initial phase of the transient, makes it possible to overcome the thermal inertia of the secondary circuit, thus enabling guarantee of comfort within the times required and already ensured by traditional direct-evaporation systems.

BRIEF DESCRIPTION OF THE DRAWINGS

The invention will now be described with reference to the annexed drawings, which are provided purely by way of example and in which.

DETAILED DESCRIPTION OF THE INVENTION

Figure 1:
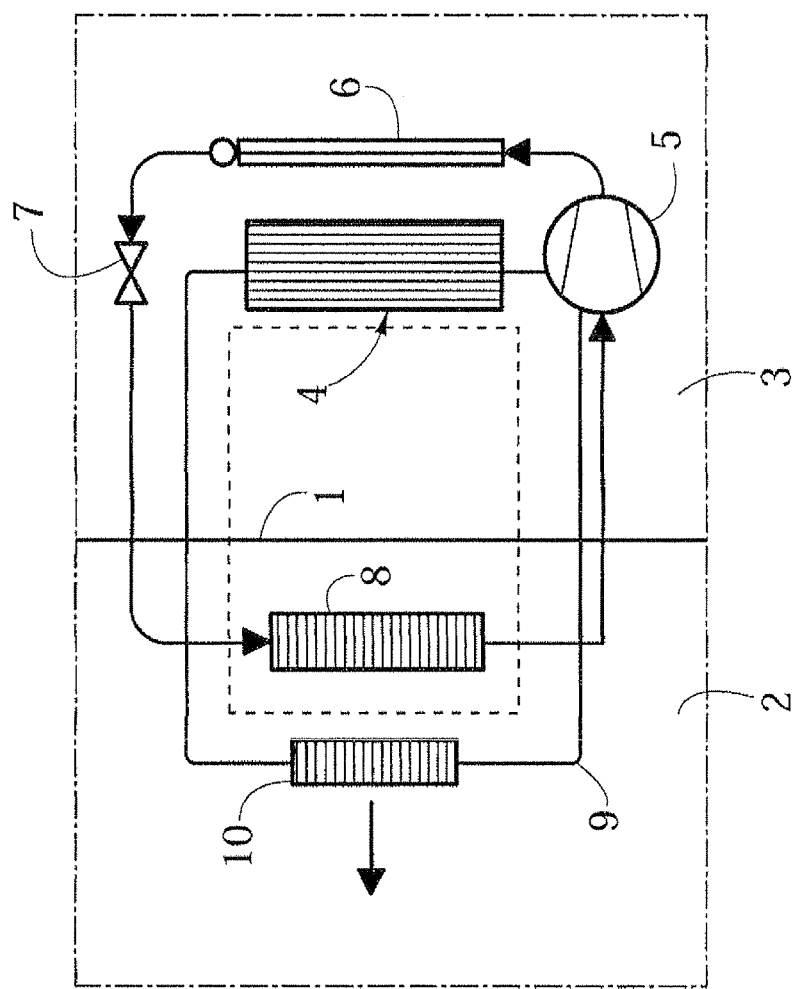
FIGS. 1 and 2 are schematic illustrations, already described above, of the systems according to the known art.
Figure 2:
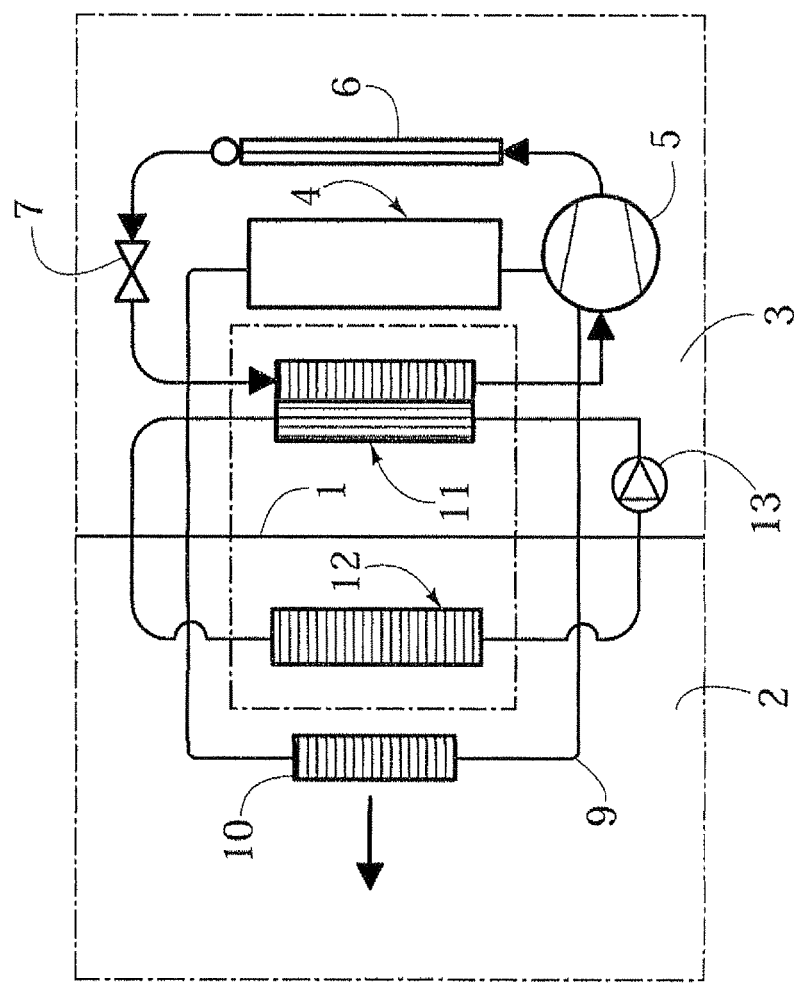

The schematic representations of FIGS. 1 and 2, which regard known solutions, have already been described above.

Figure 3:
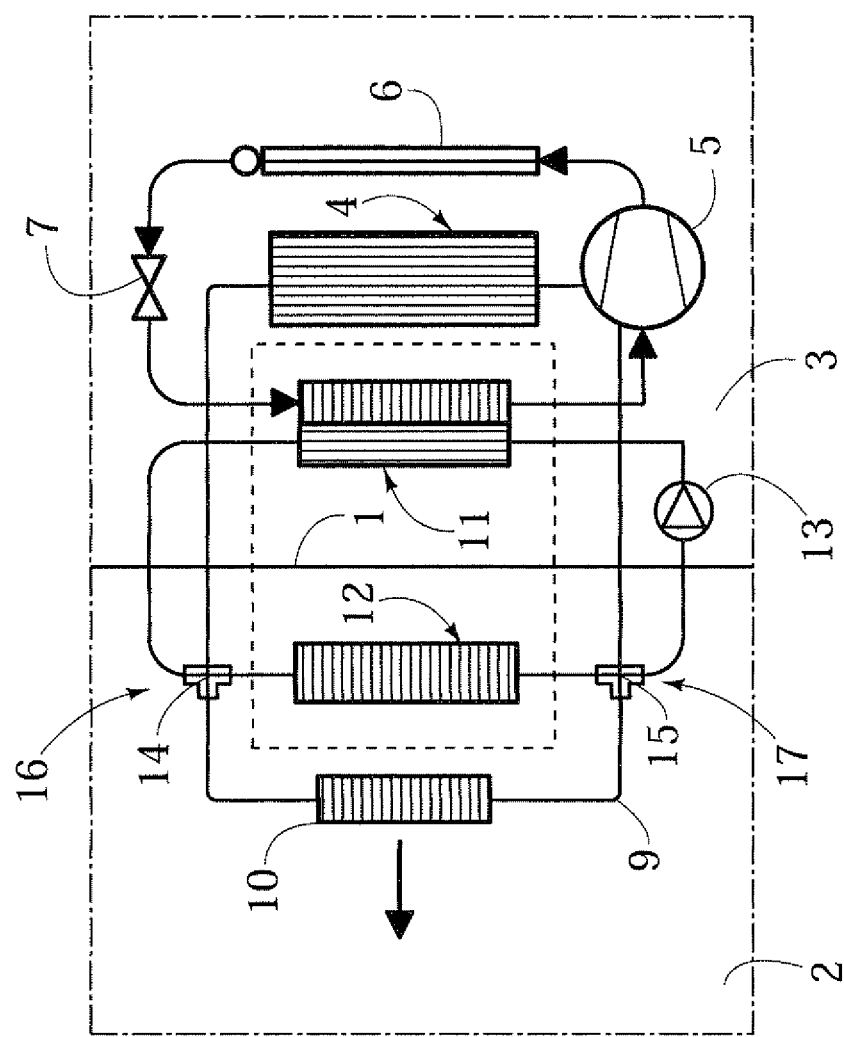
FIG. 3 is a schematic illustration of a preferred embodiment of the system according to the invention.

FIG. 3 illustrates an example of embodiment of the system according to the invention, which is of the secondary-circuit type already illustrated in FIG. 2. In FIG. 3, the parts in common with those of FIG. 2 are designated by the same reference numbers. As is evident from FIG. 3, the main difference with respect to FIG. 2 lies in the fact that, in this case, the secondary circuit and the heating circuit are in communication with one another at the nodes designated by 14 and 15 in FIG. 3. At least at said nodes 14, 15, or even in both, as illustrated in FIG. 3, four-way valves 16, 17 are provided that can be controlled using means of any known type. The valves 16, 17 have a structure of any known type and are provided so that in a first operating condition, corresponding to the condition of activation of the heating for the passenger compartment, the hot fluid coming from the engine is directed through the radiant mass 10, and then returns to the engine, whilst the fluid that traverses the secondary circuit, coming from the heat exchanger 11 (chiller), can flow only through the heat exchanger 10. When, instead, the heating for the passenger compartment is deactivated, the valves 16 and 17 are brought automatically (for example, by an electronic control unit, in the case the where the valves 16, 17 are solenoid valves) into an operating condition such that the fluid that traverses the secondary circuit, coming from the heat exchanger (chiller) 11, can flow both through the heat exchanger 10 and through the heat exchanger 12. The flows at output from the heat exchangers 10, 12 are conveyed then again into a single duct that takes them back into the secondary circuit, to the pump 13. In said condition, the communication of the duct that traverses the heat exchanger 10 with the circuit for cooling the engine is interrupted (the annexed drawing does not represent the means, in themselves known, by which circulation of coolant coming from the engine through the heat exchanger 10 when the heating system is not active is in any case avoided).

In the case of the present invention, the connection of the secondary circuit with the circuit for heating the passenger compartment, by means of one or two four-way valves 16, 17 enables, according to the momentary need for extraordinary power, to supply with cold mixture also the radiant mass 10, which by being set in series along the passage of the air downstream of the cold mass 12, is usually supplied with hot mixture taken from the circuit for cooling the thermal engine of the vehicle.

As may be seen, the pre-set result is obtained with a few simple modifications with respect to the traditional system, consisting in the introduction of one or two four-way valves 16, 17 and in the replacement of the radiant mass 10 of a traditional type with a heat exchanger including the devices usually provided in the heat exchanger-evaporator 8 for proper evacuation of the condensate water, which, having been subtracted from the damp air that traverses the heat exchanger, is deposited on the fins of the heat-exchanger tubes. For the same reason, there must moreover be adopted a device for discharge of the condensate similar to what is usually present in an area such as that of the evaporator 8. In addition, it is necessary to make sure that the counter-pressures opposed to the flow of the water/glycol mixture in the two branches that traverse the heat exchanger 12 and 10, respectively, are equal. Finally, to overcome the phenomenon of the so-called "flash-fogging", due to the cold mass of the heat exchanger that has remained moistened by the condensate subtracted from the damp air during the previous trip, it may be envisaged, in a way in itself known, to orient the air towards the feet of the driver for the first few minutes of operation of the system, so as to dry out the mass.

Thanks to the aforesaid simple modifications, as may be seen, the invention enables exploitation of the heat exchanger, which is in any case provided in order to heat the air of the passenger compartment, as a further source of cold to be exploited in conditions where power peaks are required of the system for cooling the air in the passenger compartment.

Of course, without prejudice to the principle of the invention, the details of construction and the embodiments may vary widely with respect to what is described and illustrated herein purely by way of example, without thereby departing from the scope of the present invention.

What is claimed is:

1. An air-conditioning system for a motor vehicle, wherein the motor vehicle has an engine compartment that contains, an internal-combustion engine, and the motor vehicle also has a passenger compartment separated from the engine compartment via a firewall, wherein said system comprises:

a primary, gas-compression, cooling circuit, entirely contained in the engine compartment and comprising:
   an evaporator or chiller, in which a fluid of the primary circuit evaporates, subtracting heat from the air that surrounds the evaporator or chiller,
   a compressor for the compression of the vapour coming from the evaporator or chiller,
   a condenser of the fluid compressed by the compressor, and an expansion device that receives the fluid from the condenser and supplies the fluid at a lower pressure to the evaporator or chiller;

a heating circuit for heating the passenger compartment, comprising a branch of a system for cooling the engine that traverses an air heating radiator set in the passenger compartment of the motor vehicle in a position such as to be lapped by a flow of air conveyed into the passenger compartment; and a secondary, air-cooling, circuit comprising:
   a first heat exchanger set in the passenger compartment, for subtracting heat from the air supplied into the passenger compartment; and
   a second heat exchanger, constituted by said evaporator or chiller of the primary circuit, which is traversed also by said secondary circuit, for subtracting heat from the fluid of the secondary circuit;

wherein:
   said air heating radiator of the heating circuit of the passenger compartment is prearranged for also functioning as an air cooler; and
   said secondary cooling circuit of the passenger compartment is connected to the heating circuit by valves that can be controlled between a first operating condition in which the fluid that traverses the secondary circuit, coming from said second heat exchanger, can flow only through the first heat exchanger of said secondary circuit; and, a second condition in which the fluid coming from the second heat exchanger through the secondary circuit will flow both in the first heat exchanger of the secondary circuit and in the aforesaid air heating radiator of the heating circuit, so that in this case the air heating radiator functions as an additional cooling source for cooling air directed to the passenger compartment.

2. The system according to claim 1, wherein the secondary circuit and the heating circuit cross in two nodes respectively upstream and downstream of the first heat exchanger of the secondary circuit and upstream and downstream of said air heating radiator.

3. The system according to claim 2, wherein in at least one of said nodes a four-way valve is provided.

4. The system according to claim 2, wherein both of the aforesaid nodes are provided with respective four-way valves.

5. The system according to claim 1, wherein said air heating radiator is provided with means for the collection and evacuation of the condensate water that forms on said heat exchanger when the latter is used as an air cooler.

* * * * *